US007657830B2

(12) United States Patent
Ovetchkine et al.

(10) Patent No.: US 7,657,830 B2
(45) Date of Patent: Feb. 2, 2010

(54) LAYOUT SIZE SHARING IN A GRID LAYOUT FOR A USER INTERFACE

(75) Inventors: Oleg V. Ovetchkine, Kirkland, WA (US); Dmitry G. Titov, Redmond, WA (US); Henry D. Hahn, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 672 days.

(21) Appl. No.: 11/121,723

(22) Filed: May 4, 2005

(65) Prior Publication Data

US 2006/0253775 A1 Nov. 9, 2006

(51) Int. Cl.
*G06F 17/00* (2006.01)

(52) U.S. Cl. .............. 715/217; 715/212; 715/219; 715/220; 715/227; 715/243

(58) Field of Classification Search ........... 715/219, 715/220, 243, 212, 217, 227
See application file for complete search history.

(56) References Cited

U.S. PATENT DOCUMENTS

| | | | | |
|---|---|---|---|---|
| 5,781,896 | A * | 7/1998 | Dalal | 707/2 |
| 5,970,506 | A * | 10/1999 | Kiyan et al. | 715/212 |
| 6,060,358 | A * | 5/2000 | Bracchitta et al. | 438/259 |
| 6,157,389 | A * | 12/2000 | Knowlton | 345/660 |
| 6,360,213 | B1 * | 3/2002 | Wagstaff et al. | 707/1 |
| 6,631,497 | B1 * | 10/2003 | Jamshidi et al. | 715/205 |
| 6,671,854 | B1 * | 12/2003 | Dunsmoir et al. | 715/207 |
| 6,675,351 | B1 * | 1/2004 | Leduc | 715/264 |
| 6,865,720 | B1 * | 3/2005 | Otani et al. | 715/219 |
| 7,346,901 | B2 * | 3/2008 | Syme et al. | 717/148 |
| 2001/0004739 | A1 * | 6/2001 | Sekiguchi et al. | 707/100 |
| 2002/0016801 | A1 * | 2/2002 | Reiley et al. | 707/523 |
| 2004/0019590 | A1 * | 1/2004 | Hladik, Jr. | 707/3 |
| 2004/0268227 | A1 * | 12/2004 | Brid | 715/504 |
| 2005/0021539 | A1 * | 1/2005 | Short et al. | 707/100 |
| 2005/0035784 | A1 * | 2/2005 | Gould et al. | 326/46 |

OTHER PUBLICATIONS

Kimball, Ralph, "Drilling Down, Up, and Across", Mar. 1996.*

* cited by examiner

*Primary Examiner*—Rachna S Desai
(74) *Attorney, Agent, or Firm*—Workman Nydegger

(57) ABSTRACT

Described is an information sharing method and mechanism used by a layout system to share information across related column and row user interface elements (corresponding to definitions). Definitions of a table or grid are grouped together with respect to sizing via a common group name. Scope values may be used to limit the grouping to selected subtrees of elements. When layout occurs, size sharing information is determined for the group-related definitions via a common size sharing object. Grouped definitions thus may be sized to the largest content to display of any one element. Elements corresponding to definitions may be manually sized by a user, or may be based on the size of a defined master element, such as the width of a header. The scope value of a group may be changed dynamically, such as by user interaction, which may cause groups to merge or split.

15 Claims, 16 Drawing Sheets

LAYOUT SIZE SHARING IN A GRID LAYOUT FOR A USER INTERFACE

FIELD OF THE INVENTION

The invention relates generally to computer systems, and more particularly to the processing of graphical and other video information for display on computer systems.

BACKGROUND

The term "layout" in user interface application platforms refers to the sizes and positions of user interface elements, such as text boxes, buttons, image boxes, and so forth. Layout has traditionally been a very difficult problem to solve in terms of the balance between power and simplicity. Typically, the more powerful a layout system, the more complex it needs to be. However, as the complexity of the system increases, so does the investment a user interface scene designer has to make in becoming educated as to the behavior of the system. The cost of the investment can be prohibitive, whereby a scene designer may settle for a simpler but less powerful layout solution.

For example, layout needs logic to handle dynamic changes. Consider that as elements or windows are resized by a user, the sizes and positions need to change, and some elements may even be removed or added back to the user interface view. Less dynamic, but still variable changes occur when the user interface language is changed as part of globalizing a program. What may be a short string on an element in one language may be a long string when translated to another language.

Even when dealing with the same language, another example of a significant problem of user interface is that the sizes of user interface elements are not always known ahead of time. Text and other content that needs to be displayed can be obtained dynamically, and thus may be variable in size.

With respect to elements that are arranged together, such as in columns and rows, there are further layout-related challenges. For example, consider a grid of rows and columns in which an element sizes itself to the content that is to be displayed in that element. Elements corresponding to a column in another row will no longer align properly in such a scenario. Similar alignment problems occur when the scene designer forces an element to a particular size, or when a user resizes a column header by dragging it. Still further complications arise with elements based on styles and the like, (where styles refer to templates such as style sheets that allow a scene designer to define default property settings once for multiple elements); multiple elements may be copied from the same style, but not otherwise related to one another, and thus typically should not align in grids simply because of the style relationship.

In general, what is needed is a way for layout to handle size changes to elements aligned in tables/grids of columns and rows. The solution should be flexible as well as straightforward for scene designers to use, so that scene designers can keep essentially unrelated elements independent as desired, including elements related only by having been created from a common template.

SUMMARY OF THE INVENTION

Briefly, the present invention is directed towards a method and mechanism by which a layout system uses a service to share information across related column and row elements. The present invention thus handles scenarios such as sizing columns and rows to content, column spanning, dynamic shared size for children (e.g., buttons) and cross-partition alignments.

In general, elements are grouped together with respect to sizing using a common name for the group. One or more scope values limit the named groups to selected subtrees of elements.

To share sizing information, definitions that are specified with a common group name may be associated with a common internal size sharing object for that group name. When layout occurs, size sharing information is thus determined for the group-related definitions via the size sharing object. In general, children of the grid are measured, and the size is stored with the definitions. In turn, the definitions provide this information to the size sharing object for calculation. When the grid is done measuring, the grid asks the definition for the size, which is provided as the maximum size of the elements within a particular named group. The grid then arranges its children with the new measure information. Because a common size sharing object is used for the children, including possibly across multiple grids, multiple related (grouped) columns will be the size (width) of the largest column, or rows the size (height) of the largest row. Definitions may thus be sized to the largest content to display. Definitions also may be manually sized by a user, and may be based on the size of a defined master element, such as the width of a header.

To prevent undesired sizing relationships, group scope values may be used to define the scope of the particular named group with respect to whether to share sizing information (e.g., between subtrees). Groups may thus be used across multiple grids for sizing purposes, or not used, as specified by the scope value or values. For two grids that want to share information, the scope property is set on a common ancestor of those grids. To prevent sharing, the scope property is set before the common ancestor.

The scope value of a group may be changed dynamically, such as by user interaction with the rendered representations of the elements. This may cause groups to merge or split, depending on whether transitioning the value from true to false (merge) or false to true (split).

Other advantages will become apparent from the following detailed description when taken in conjunction with the drawings, in which:

DETAILED DESCRIPTION

Exemplary Operating Environment

Figure 1:
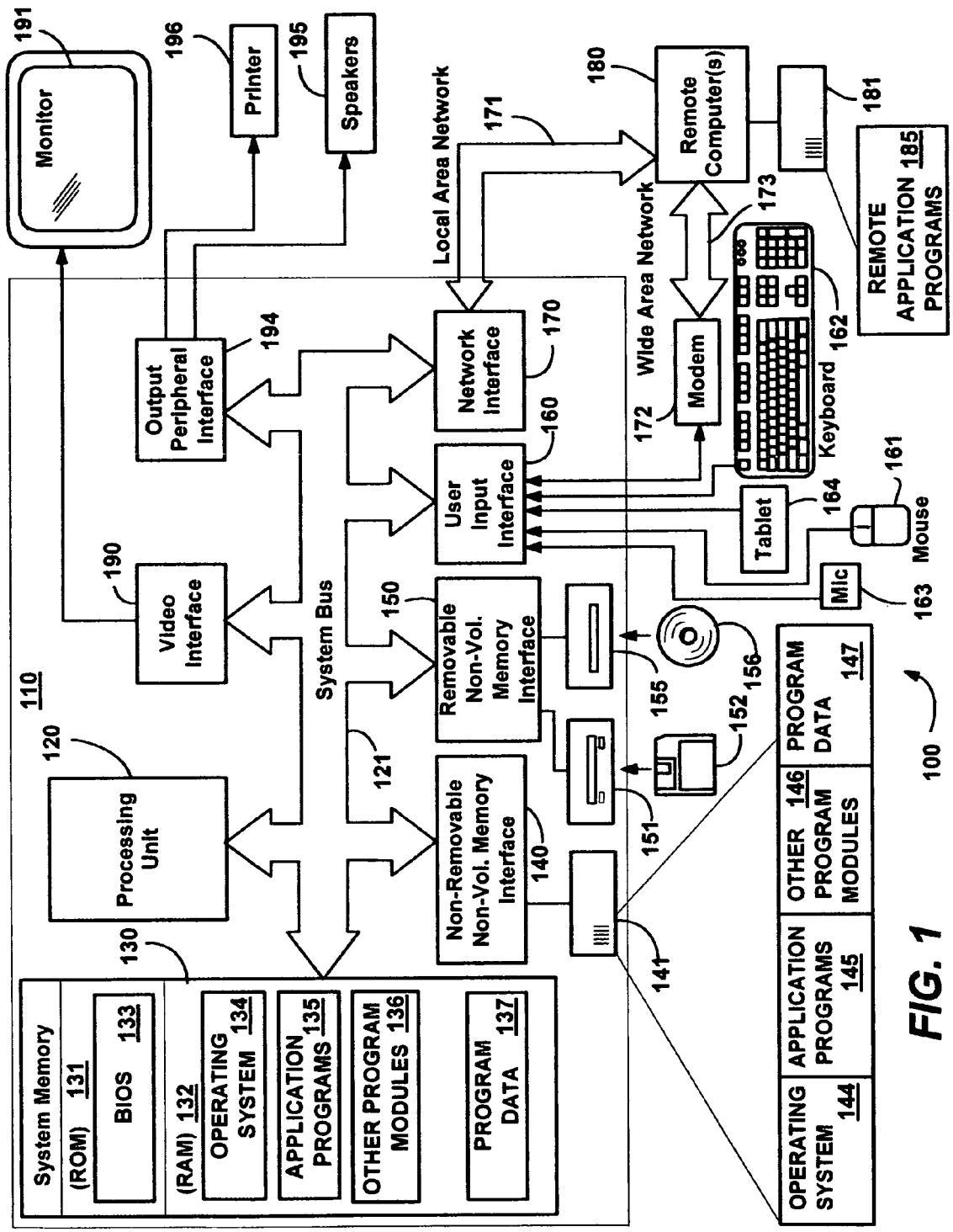
FIG. 1 is a block diagram generally representing a computing environment into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention also may be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 also may be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Layout System Size Sharing

The present invention is generally directed towards solving a number of resizing problems that exist when dealing with user interface elements. Such problems include sizing an element to content while maintaining the alignment of related elements, resizing a column header and the elements beneath it while retaining the ability able to scroll (without scrolling the header), and so forth. To this end, the present invention provides layout system functionality that relates scene designer-specified elements to one each other with respect to sizing operations.

As will be understood, numerous ways to implement the present invention are feasible, and only some of the alternatives are described herein. For example, the present invention is primarily described below with reference to markup that is parsed into trees and subtrees of user interface elements, however a scene designer can specify user interface elements and the like in other forms. As another example, in an implementation described herein, size sharing is a service built into grid, which uses information from the service because it is happening at layout's measure and arrange time. Alternatively, or in addition to the grid, size sharing may be built into other panels, whereby each case of the layouts would use the information in its own specific way. As such, the present invention is not limited to any particular examples used herein, but rather may be used various ways that provide benefits and advantages in computing in general.

Figure 2:
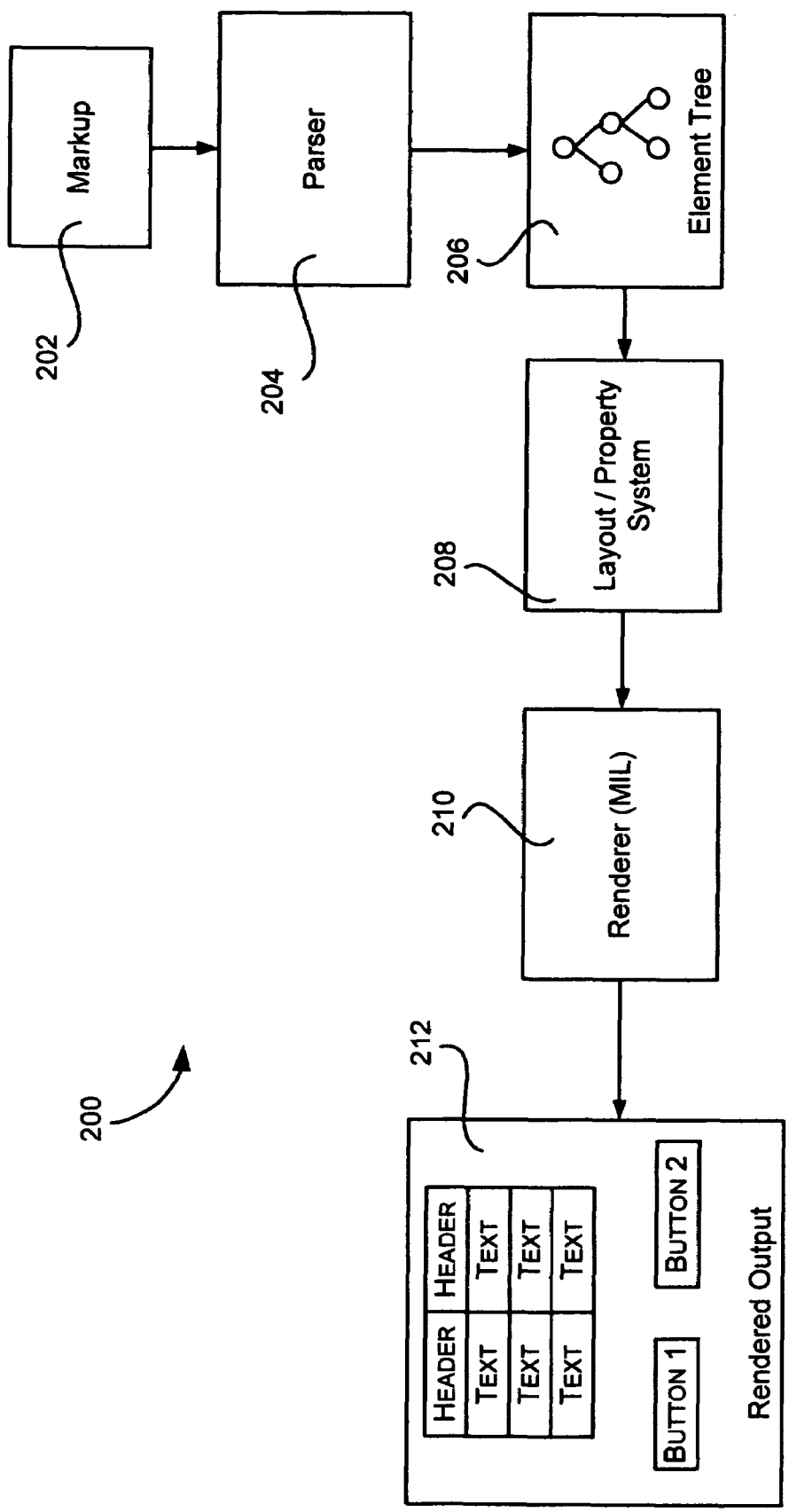
FIG. 2 is a block diagram including a general user interface rendering architecture, including a layout and property system configured in accordance with various aspects of the present invention.

Turning to FIG. 2, there is shown an example architecture 200 for rendering user interface elements. In general, a scene designer provides code (e.g., markup 202 of a suitable markup language) to cause user interface elements to be rendered as specified by the scene designer. For example, via markup, a scene designer may specify that a button should appear on the screen with certain parameters such as color, border, text and/or other appearance information. From this markup 202, a parser 204 constructs an element tree 206 of elements. The tree may have a number of parent and child elements, and a parent may be a container for one or more child elements, e.g., a parent menu bar may have child icons positioned therein. A child may be a parent of another child.

One such element is a grid (or table) element, which is a parent element to one or more column and/or row elements, which are specified via ColumnDefinition and RowDefinition designations, respectively. The grid element may be a subtree to another element, such as a listview element having multiple grid elements as children. As described below, the present invention enables a scene designer to coordinate multiple instances of layout, whereby columns or rows are automatically resized when a related column or row is resized, thereby maintaining alignment and other desired visual characteristics.

In accordance with an aspect of the present invention, in general, a scene designer can group elements together with respect to sizing, such as via defined columns or rows, using a name for the group. Using a scope value, the scene designer can limit the relationships to selected subtrees of elements, whereby, for example, elements related only by a style (via a template such as a style sheet from which elements may be created) need not resize when an otherwise unrelated element is resized. The following example markup shows how to associate a grid's definition (ColumnDefinition) with a Group name for the purpose of shared sizing:

```
<Grid>
    <ColumnDefinition SharedSizeGroup="foo"/>
    ...
</Grid>
```

Figure 3:
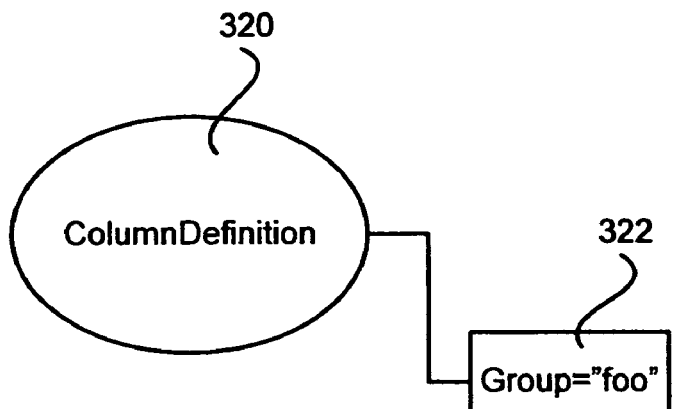
FIG. 3 is a representation of how an example definition element (ColumnDefinition) may be associated with a named group property in accordance with various aspects of the present invention.

To share sizing information, a layout system (or subsystem) and property system 208 is provided that allows the straightforward use of properties in the form of groups and scopes to determine user interface element behavior with respect to relating the sizing of one element to the resizing of other elements. To this end, a user interface scene designer is able to define a ColumnDefinition or RowDefinition (referred to as a "definition" herein), and set a Group property (SharedSizeGroup) for that definition. This is visually represented in FIG. 3, wherein an example column definition 320 is associated with a named group 322, which the scene designer may do via markup, as described above.

Further, the scene designer may set up a master-slave relationship between elements, in which a master element's size defines the size for an entire row or column, whereby, for example, a header can be a master for a column, and all related elements in the column sized based on the header width. A master-slave relationship can be specified for a group by setting a Width property for a ColumnDefinition, and a Height property for a RowDefinition. A master-slave relationship means that the master defines the size for the entire row or column. Note that the header may or may not be in the same subtree as the columns and rows, yet still be related via sizing information. This allows, for example, interaction with a vertical scrollbar to not scroll the headers, while interaction with a horizontal scrollbar to scroll the headers.

If more than one master is set for a group, the last value set wins, and the Width/Height and Group properties are order independent. Thus, for example, the following markup results in a Button that is 40×40 pixels (or equivalent units):

```
<Grid>
    <ColumnDefinition Width="100" SharedSizeGroup ="foo"/>
    <RowDefinition SharedSizeGroup ="foo" Height="40"/>
    <Button Grid.Top="0" Grid.Left="0" Grid.Right="0"
Grid.Bottom="0">Hello</Button>
</Grid>
```

Upon creating a definition, an InvalidationCallback is fired from the element property system 208. If a corresponding definition is in the tree 206, the layout/property system 208 attempts to obtain an internal size sharing object for the group name, (which may be of limited scope, as described below). If not in the tree, the definition does not connect to its internal size information-sharing object.

Figure 4:
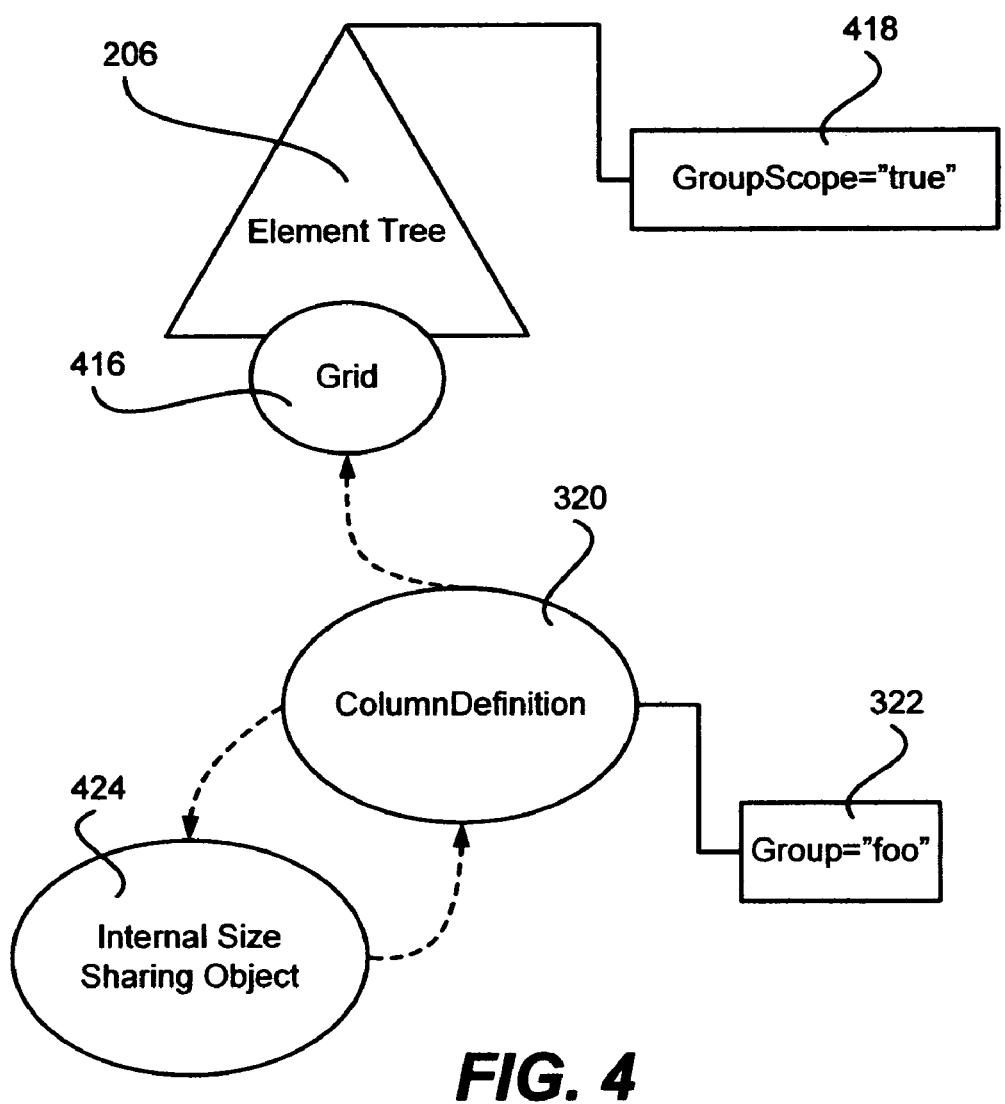
FIG. 4 is a representation of how an example definition element associated with a group property may be used with a grid element and associated with an information sharing object and a group scope value, in accordance with various aspects of the present invention.

When interacting with visual or logical trees and a group property has been set, the definition is added to a grid element 416 in an element tree 206, as generally represented in FIG. 4. Upon being added to the tree 206, an inherited property IsSharedSizeScope value (represented in FIG. 4 by block 418 and described below) on the definition 320 is invalidated, giving the definition a callback from the property system.

Further, the definition 320 then registers itself with an (e.g., internal) size information sharing object if it has already been created; if not, one will be created. The internal size information-sharing object, represented as the object 424 in FIG. 4, then holds a reference to this definition 320 and the definition 320 has a reference to this object 424. The reference from the object 424 to the definition 320 is for setting "dirty" states on other definitions that may be in the tree, whereby the definition knows to resize. The reference from the definition 320 to the object 424 lets the definition 320 provide and access the shared sizing information. Note that the process represented in FIG. 4 may happen multiple times to register many definitions, and does not necessarily have to have happen before layout happens with some of definitions already in the tree.

Note that the Group property may be changed with respect to a definition in the tree. More particularly, if the Group property is not set before the definition is added to the tree, the definition is just a "normal" definition (with no size sharing). If the Group property is set later, this may cause the creation of an internal size information-sharing object, if one has not already been created, or an addition to one that has already been created. This also will cause a layout invalidation, and layout will reoccur with the new group information.

Turning to the concept of scopes, in general, a group scope value, defines the scope of the particular named group with respect to whether to share sizing information (e.g., between subtrees). More particularly, the sizing mechanism provides for scoping of sizing groups. This means that Groups can be used across multiple grids for sizing purposes, or not used, as specified by the scope value. In one implementation, the scope is defined by the IsSharedSizeScope property and the physical tree structure. Each IsSharedSizeScope is a Boolean property having a true or false value; in general, for two grids that want to share information, the scope property is set on a common ancestor of those grids. To prevent sharing, the scope property is set before the common ancestor.

Figure 5:
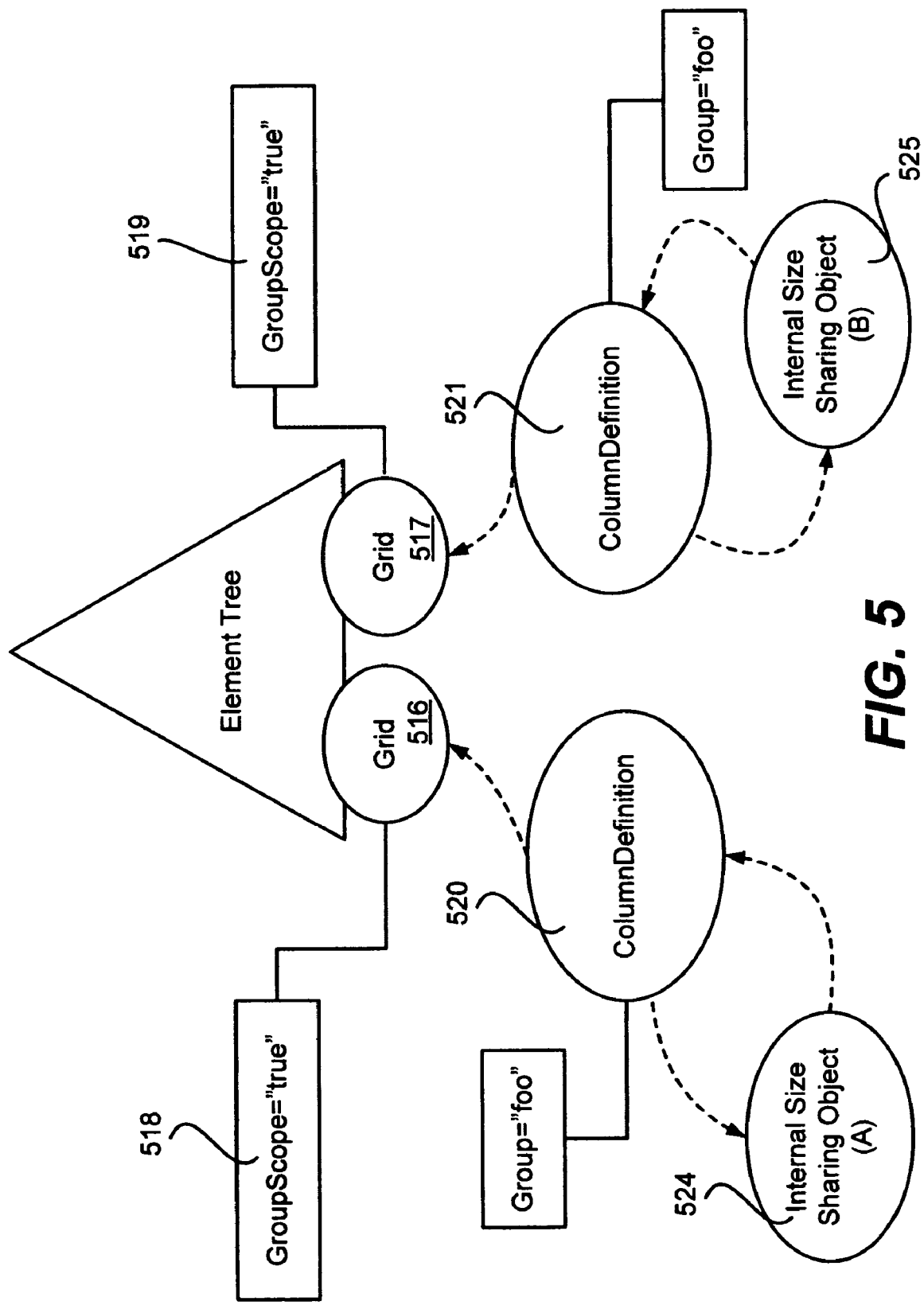
FIG. 5 is a representation of example definition elements associated with different information sharing objects based on group scope values, in accordance with various aspects of the present invention.

If the IsSharedSizeScope property is set on a non-common ancestor of the definitions with like-named groups, sharing will not take place, and more than one internal information-sharing object will be created. FIG. 5 provides a visual representation of a similarly-named group that is not within the same scope. Note that each column definition 520 and 521 in FIG. 5 has its own internal size sharing object, 524 and 525, respectively, due to each grid 516, 517 having its own scope 518, 519, respectively, each set to true.

Figure 6:
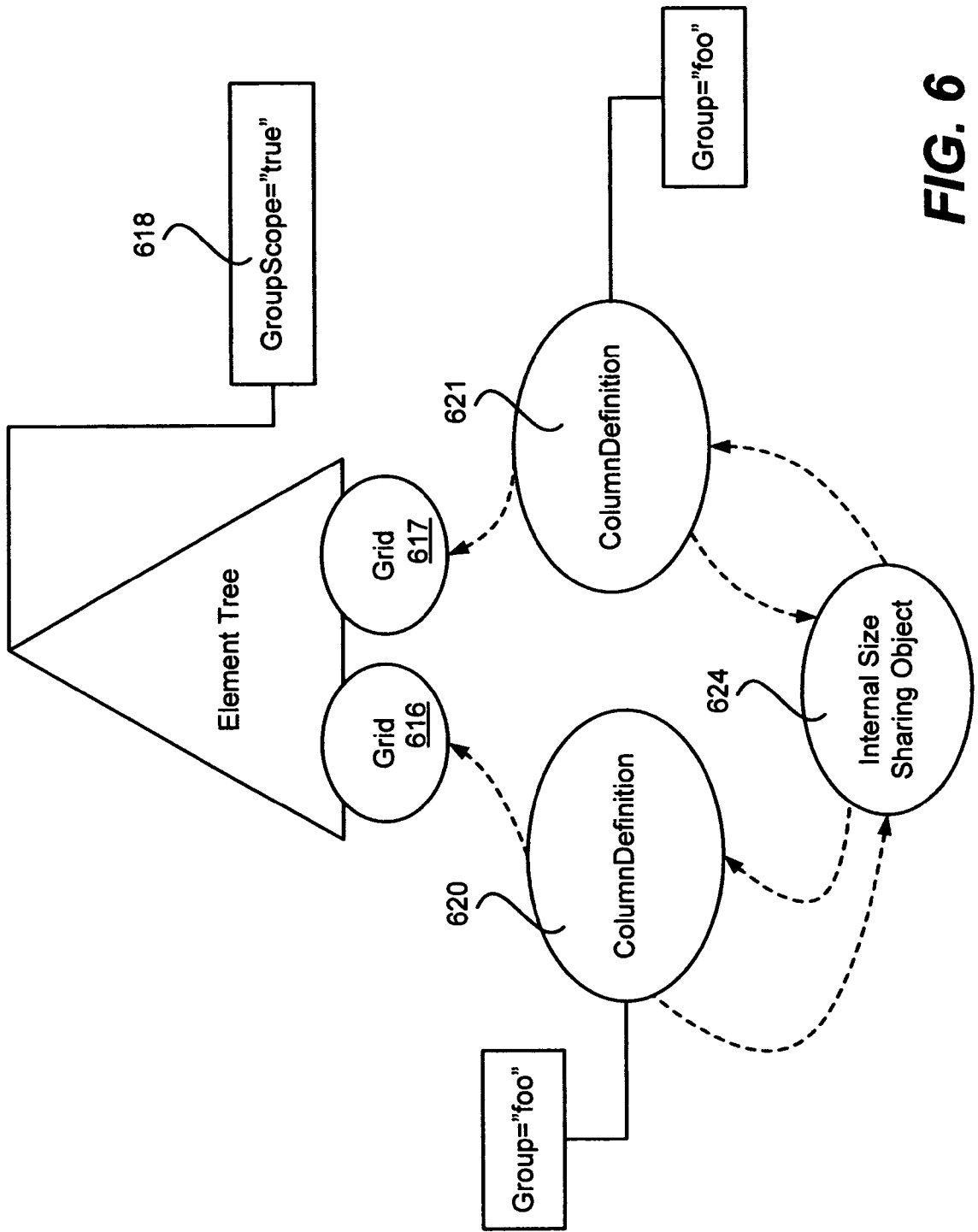
FIG. 6 is a representation of example definition elements associated with a common information sharing object based on a group scope value of a common ancestor, in accordance with various aspects of the present invention.

In contrast, FIG. 6 represents a similarly-named group within the same scope. Because the IsSharedSizeScope property 618 is set on a common ancestor of the definitions having like-named groups, sharing takes place. Note that in FIG. 6, only one internal information-sharing object 624 is created for both column definitions 620 and 621. As a result, if an element contained in the column defined by definition 620 is resized, the column defined by definition 621 will correspondingly resize.

Note that the scope value of a group may be changed dynamically, such as by user interaction with the rendered representations of the elements. This may cause groups to merge or split, depending on whether transitioning the value from true to false or false to true and on the scope's location in the hierarchy.

Figure 7A:
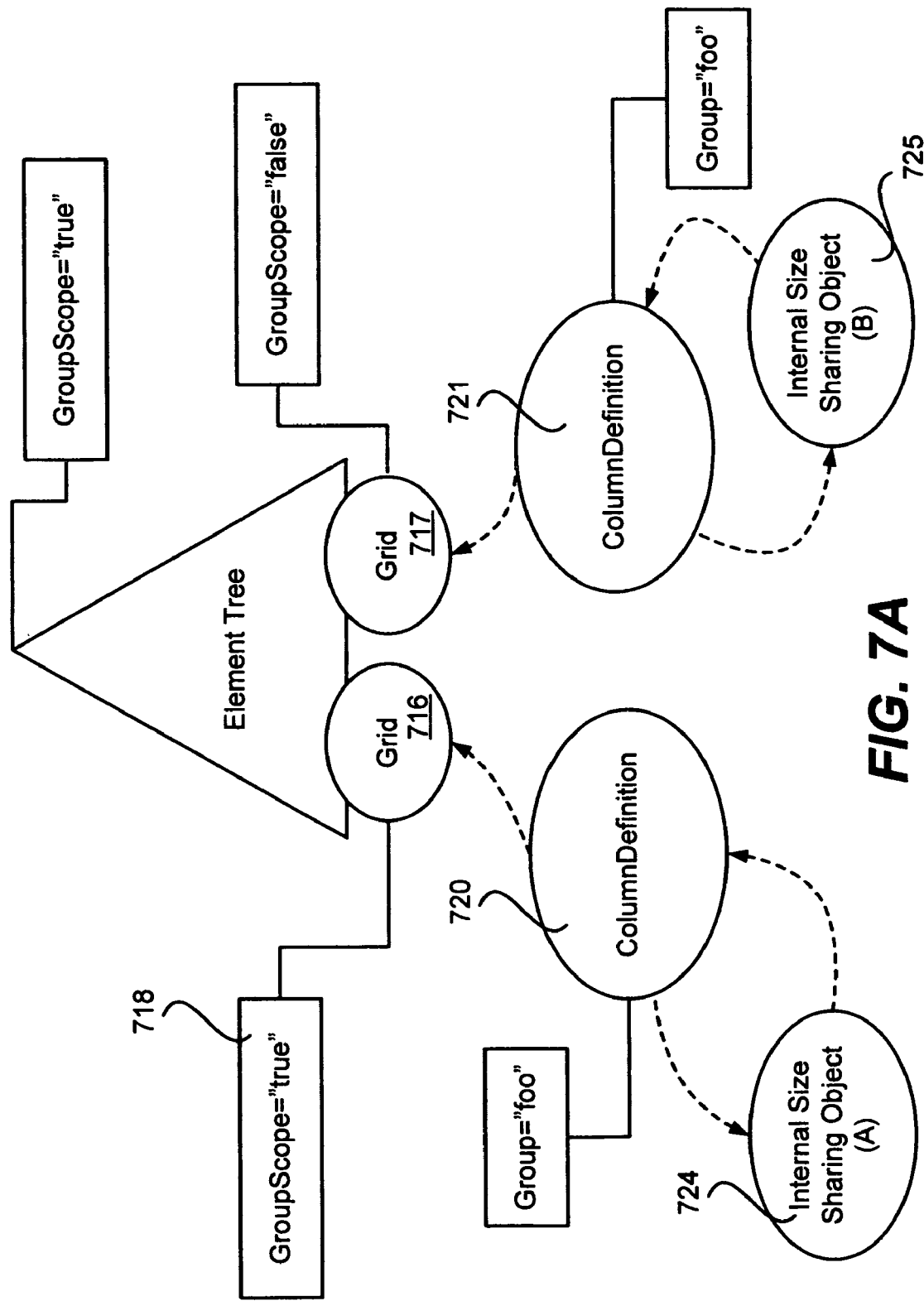
FIGS. 7A and 7B are representations of example definition elements transitioning to have information sharing objects merged based on a transitioned group scope value, in accordance with various aspects of the present invention.
Figure 7B:
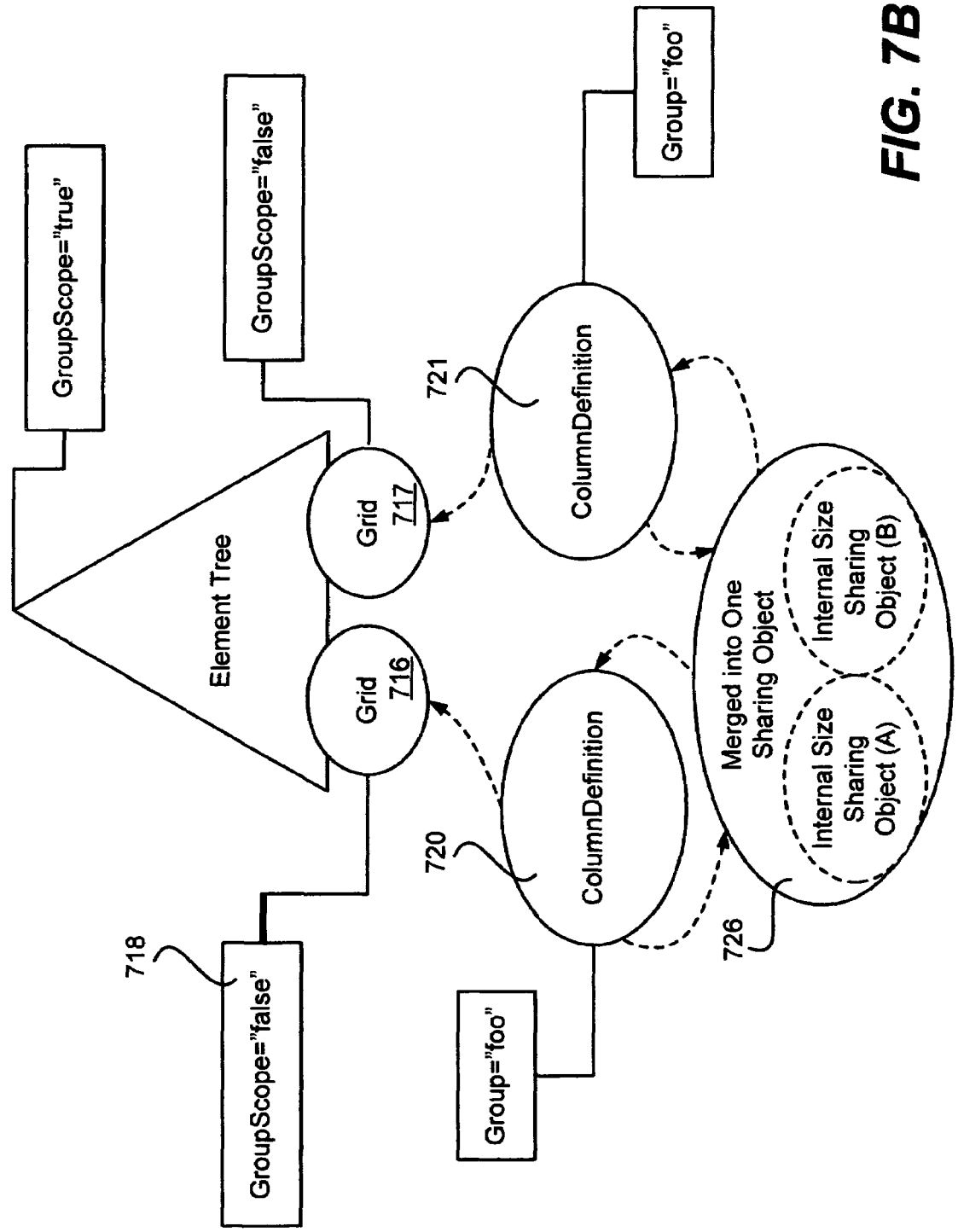

FIGS. 7A and 7B represent group merging as a result of changing scope over time, by changing the value of the IsSharedSizeScope property on the grid 716 from true (FIG. 7A) to false (FIG. 7B). In effect, this causes two different groups that were separated by scope to merge, and is generally handled by including the definitions that are considered during layout. FIGS. 7A and 7B show the transition from two separate objects 724, 725 (FIG. 7A) to one object 726 (FIG. 7B).

In the case that there are two masters after a merge (one from each previously separate scope), the one that was added should be the master. Although this is likely a rare occurrence, the user may have more ease setting the Width or Height on a definition that is closer to the scoping element.

Figure 8A:
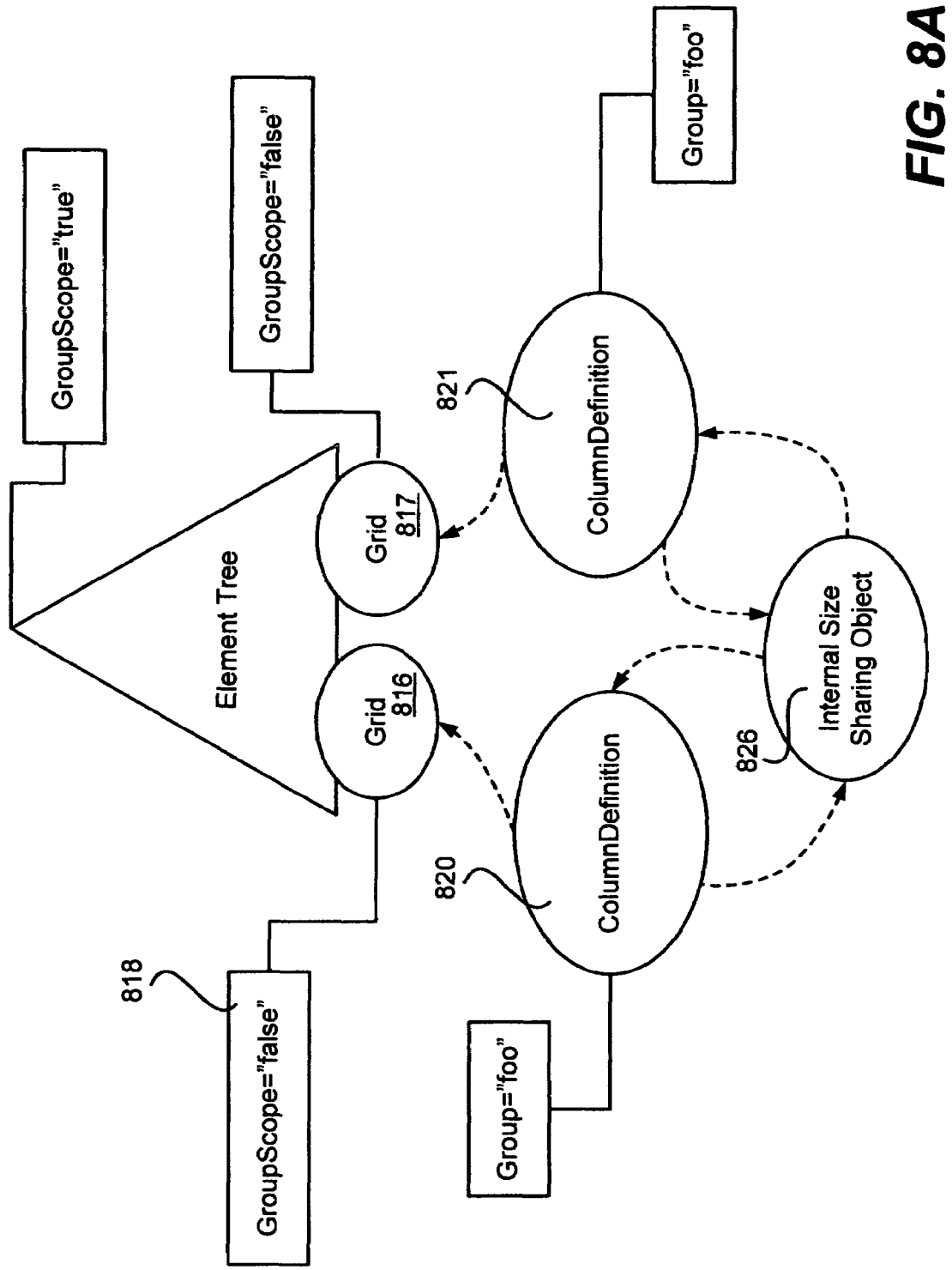
FIGS. 8A and 8B are representations of example definition elements transitioning to have a common information sharing object split into separate objects based on a transitioned group scope value, in accordance with various aspects of the present invention.
Figure 8B:
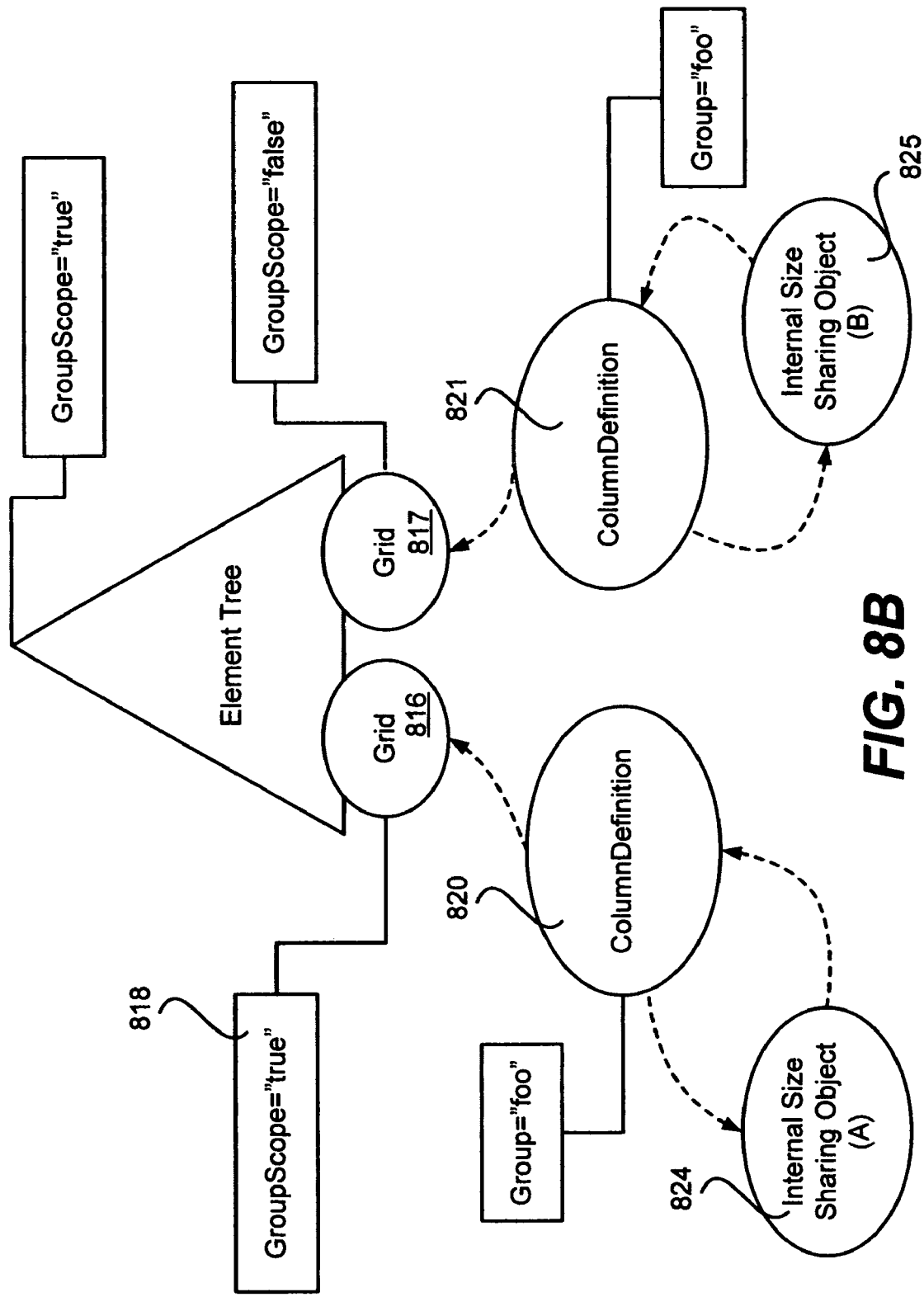

As can be readily appreciated, dynamically changing the value of the IsSharedSizeScope property from false to true may cause one group to become two. The two groups are created with two separate internal information sharing objects, as shown in the transition from FIG. 8A to 8B. In this transition, the value for the group scope 818 is changed from false (FIG. 8A) to true (FIG. 8B), whereby the common size sharing object 826 (FIG. 8A) is split into independent size sharing objects 824 and 825 (FIG. 8B).

Note that when merging or splitting, the change to the IsSharedSizeScope group property value should cause layout to update immediately, to reflect the new merged UI presented to the user. This is because the merging likely happened as a result of user interaction, providing a solid cause and effect relationship to the user.

Figure 9:
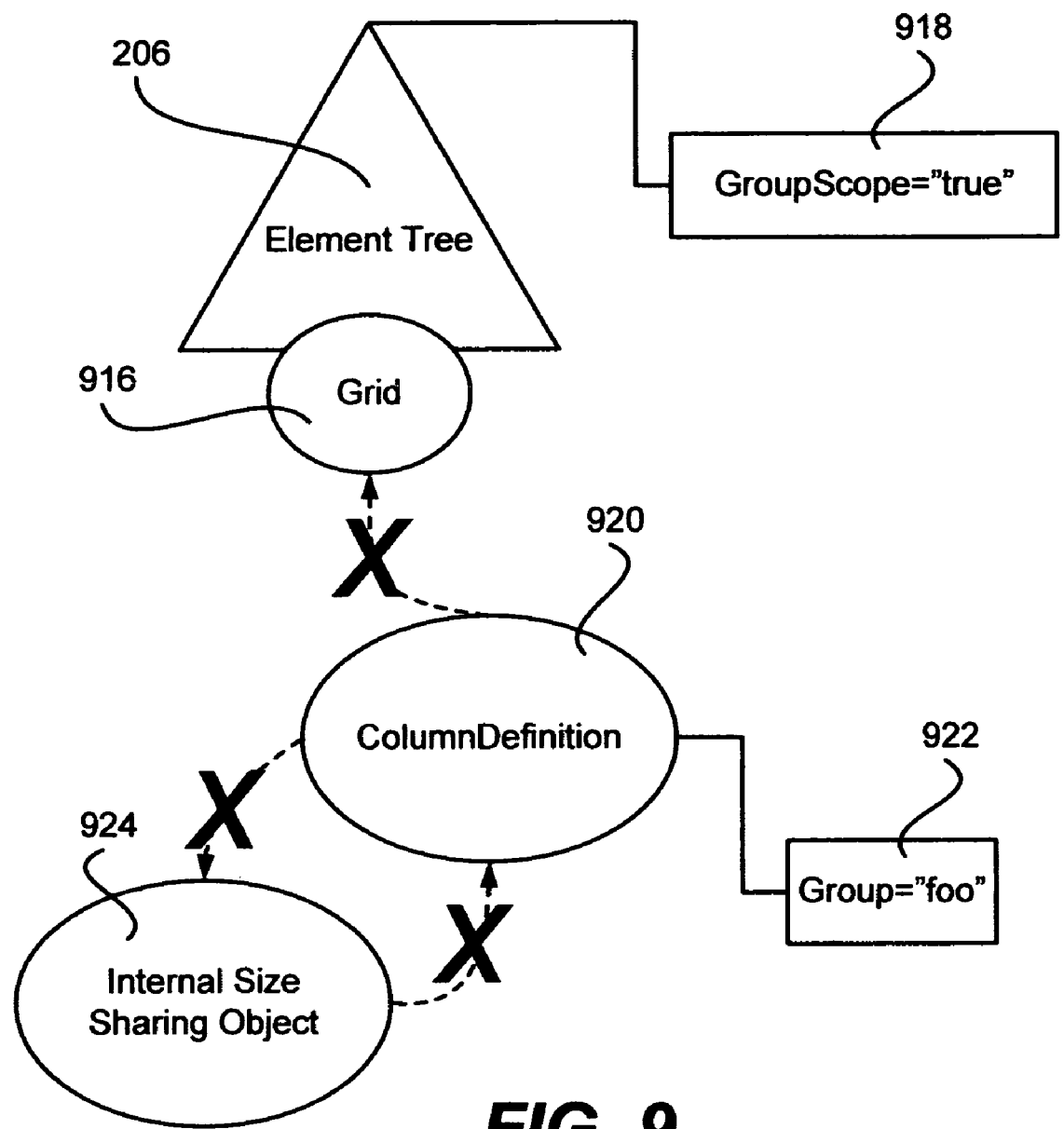
FIG. 9 is a representation of a definition being removed from a tree, including releasing references, in accordance with various aspects of the present invention.

If a definition is removed from the tree, either from a style change or by something manually removing it, the size information-sharing object needs to release the references to the definition. This is in part to prevent a memory leak which would occur if left unreleased, e.g., because if not released a garbage collector or similar clean-up mechanism cannot collect it. Also, when the next layout pass occurs, the definition should not be included in the sizing calculations; for example, this can be done when the IsSharedSizeScope property invalidates as a result of being removed from the tree. FIG. 9 represents removing a definition from a grid in the element tree, where the large x-shaped cross-out symbols represent releasing of the references.

Note that dynamic changes (changes once the definition is in the tree) to the Group property name on a definition name cause the shared information object to remove that definition from its references. This may require creation of a new shared information object. This also dirties other definitions in the object's collection.

Turning to an explanation of layout, when layout occurs, the grid element performs its normal layout process, such as described in copending U.S. patent application Ser. No. 11/074,476 filed Mar. 7, 2005, assigned to the assignee of the present invention and hereby incorporated by reference. In general, children are measured, and the size is stored with the definitions. In turn, the definitions provide this information to the size sharing object for calculation. When the grid is done measuring, the grid asks the definition for the size, which is provided as the maximum size of the minimum computed by the size information-sharing object. The grid then arranges its children with the new measure information. Thus, in this manner, for example, multiple related (grouped) columns will be the size of the largest column, which may be sized to its content to display, or manually sized by a user. The object may also use the size of a master to determine the shared column width.

FIGS. 10-14 provide some example screenshots and representations of other user interface elements when layout occurs using shared sizing information. In general, these examples show scenarios such as sizing columns and rows to content, column spanning, dynamic shared size for children (e.g., buttons) and cross-partition alignments. For example, consider the following example markup, generally corresponding to the representation in FIG. 10:

```
<Grid>
    <RowDefinition Height="Auto"/>
    <RowDefinition Height="Auto"/>
```

-continued

```
    <RowDefinition Height="Auto"/>
    <ColumnDefinition Width="Auto"/>
    <ColumnDefinition Width="20"/>
    <ColumnDefinition Width="Auto" SharedSizeGroup="buttons"/>
    <ColumnDefinition Width="Auto" SharedSizeGroup="buttons"/>
    <ColumnDefinition Width="Auto" SharedSizeGroup="buttons"/>
</Grid>
```

Figure 10:
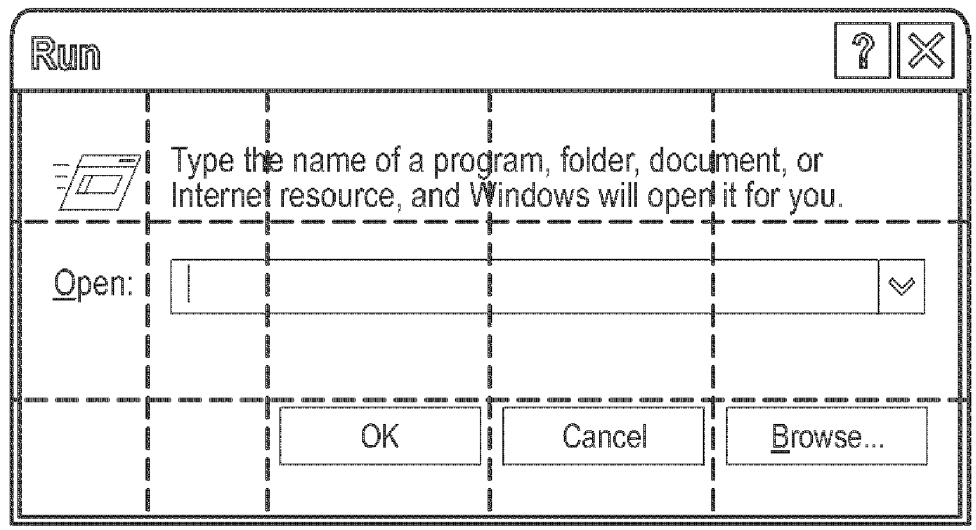
FIG. 10 is a representation of a grid layout for a dialog, with a resultant screenshot rendered based on the grid, in accordance with various aspects of the present invention.
Figure 10:
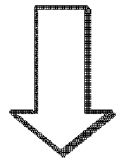
Figure 10:
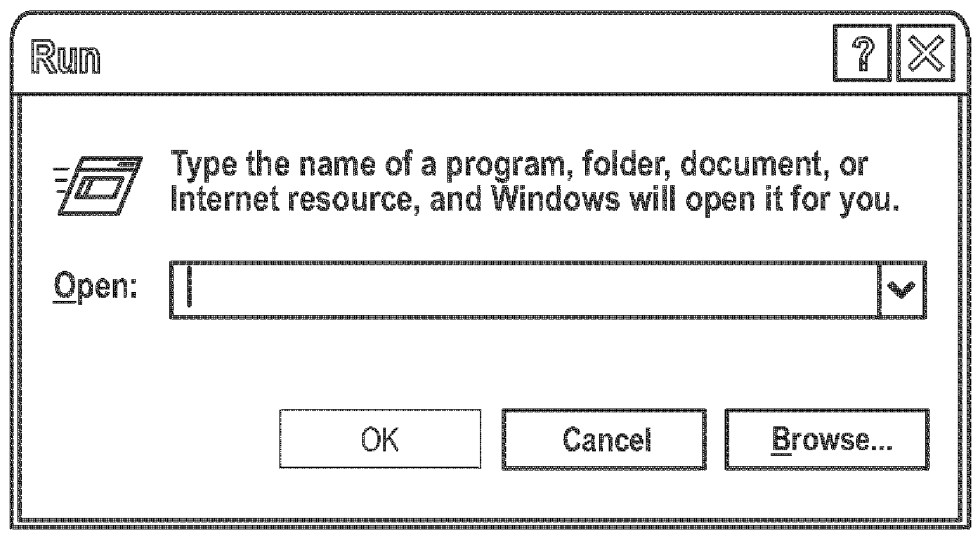

The "Run" dialog, shown in FIG. 10 as a screenshot and with a grid superimposed, is a top-level layout with a more involved layout than a button or menu item. For example, if the dialog is localized, it would be desirable to use the sizing behavior of the present invention to avoid or minimize the use of fixed sizes. In this example, in the first column, the word "Open" may require dynamic sizing, however the small icon in the top, left corner is likely a fixed size. "Auto" sizing can be used.

The second column is potentially fixed size; it merely offsets the instruction text and TextBox from the left (both likely span the last four columns, as well). The third, fourth and fifth columns need to size to content, for the length of the localized text; because of the group definition, the buttons share sizes, and are thus stretched to their maximum size. Thus, as can be seen in FIG. 10 and via the markup, the buttons are resized horizontally based on the largest string appearing in a button. In this example, the two-character "OK" button is the same size as the "Cancel" button, and both are based on the "Browse..." button size. Note that the height of the first row may be dynamic to allow for differing sized description text.

Figure 11:
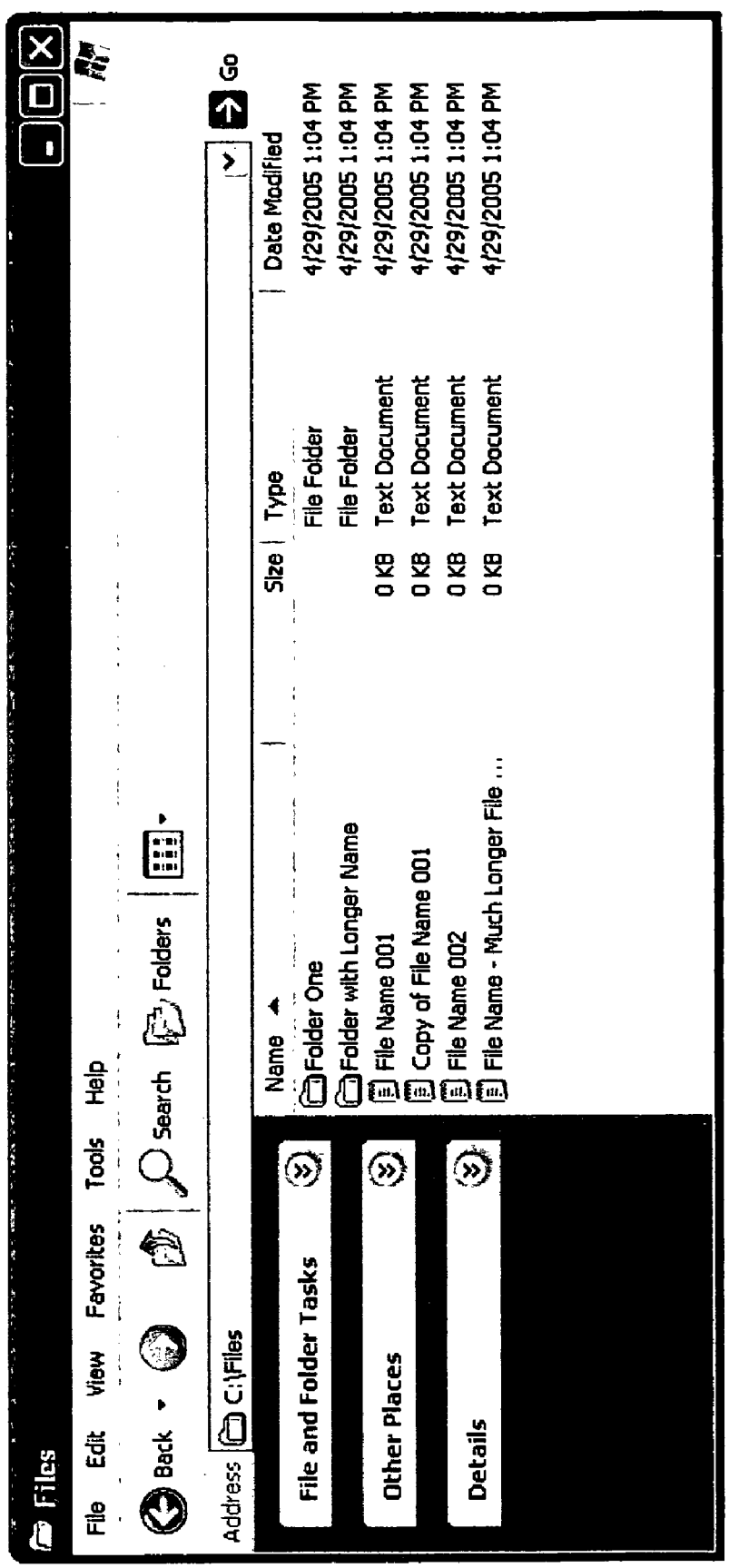
FIGS. 11-14 comprise various screenshot representations of rendered elements laid out based on size sharing, in accordance with various aspects of the present invention.

Thus, via the present invention, in a grid scenario columns may size to content, whereby the longest item in the column will define the width of the column. Likewise, a developer has programmatic access to force a column to size to content (such as double clicking on the splitter between column headers). Also, a user can drag column widths by dragging headers from left to right or right to left. With the present invention, this affects the entire column when the user releases the header. FIG. 11 shows an example of a "ListView Details View" comprised of grids, where the columns may be adjusted in these various ways.

Figure 12:
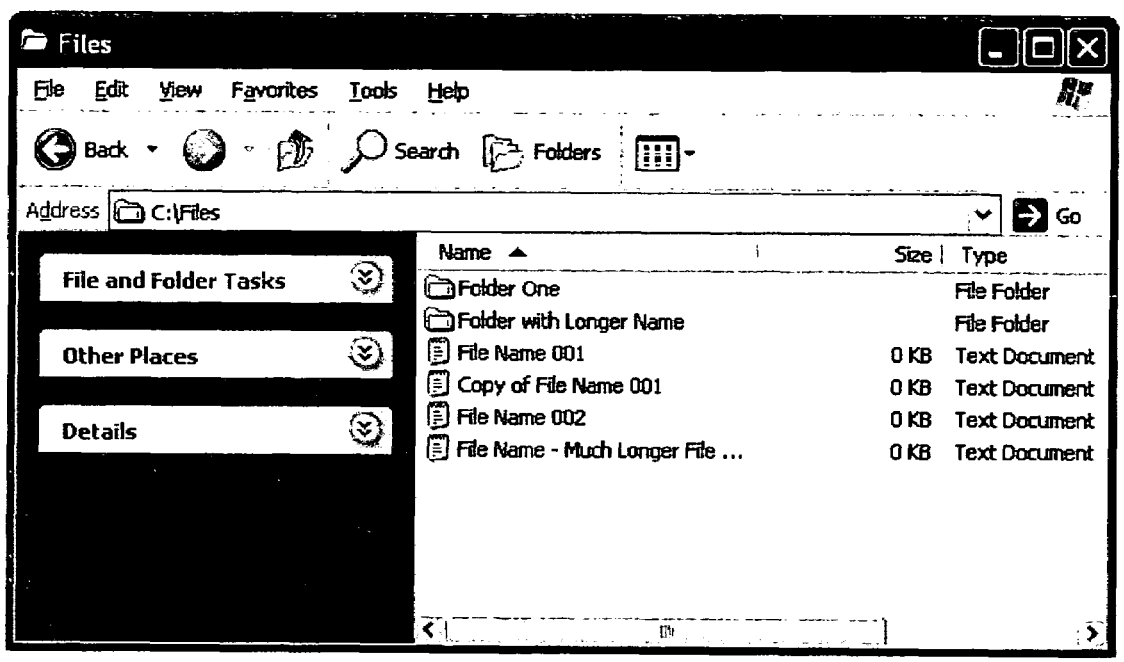

Scrolling may be contained based on whether the scrolling is vertical or horizontal. By selectively defining a header (e.g., master) to be in the same subtree as the columns but not the rows, for example, use of the vertical scrollbar will not scroll the headers while use of the horizontal scrollbar will scroll the headers. FIG. 12 is a representation of when horizontal and vertical scrolling are both available and headers are present for the columns.

Figure 13:
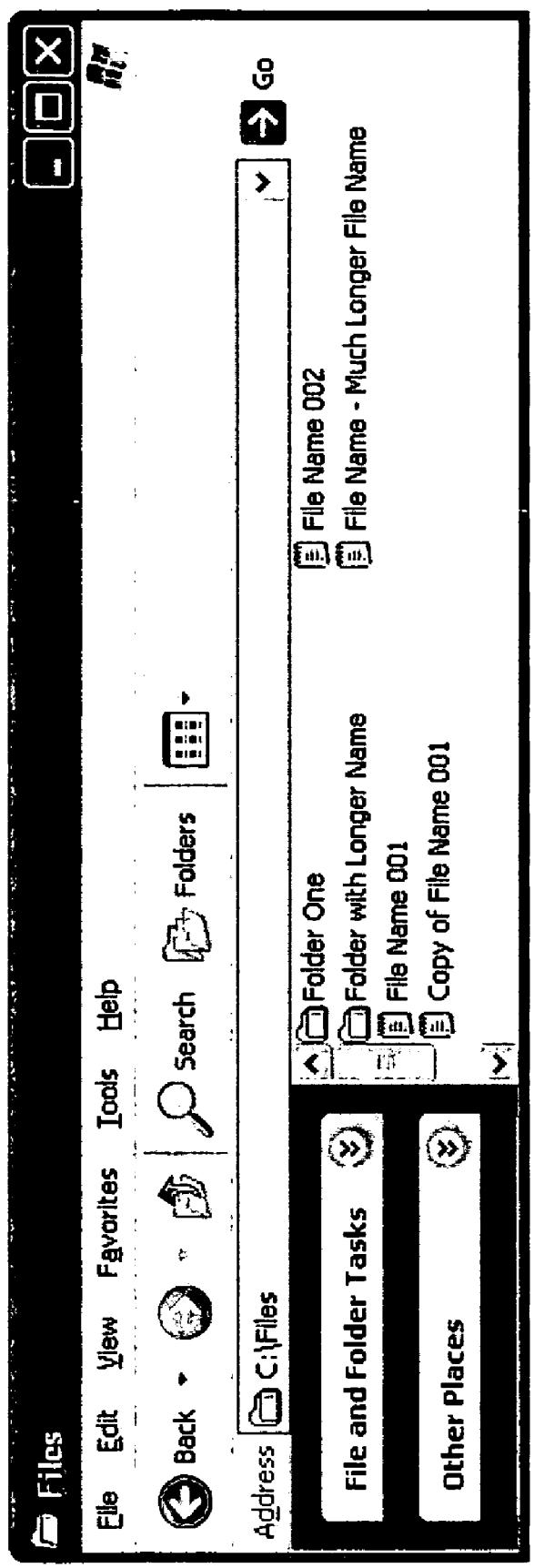

Similar to the previous examples, column information is shared during flowing. For example, the "ListView List View" of FIG. 13 shows how columns are effectively created when items flow. In FIG. 13, each item may be considered a grid. Each column is the same width, which is based on the width of the largest column inside an item that has been realized. Note that this example scenario usually does not involve resizing those columns, but this is not precluded. One reason this is supported is for a list-style case, in which each item is not homogenously sized (in Width), but the "columns" line up horizontally (on the left in the example of FIG. 13).

Figure 14:
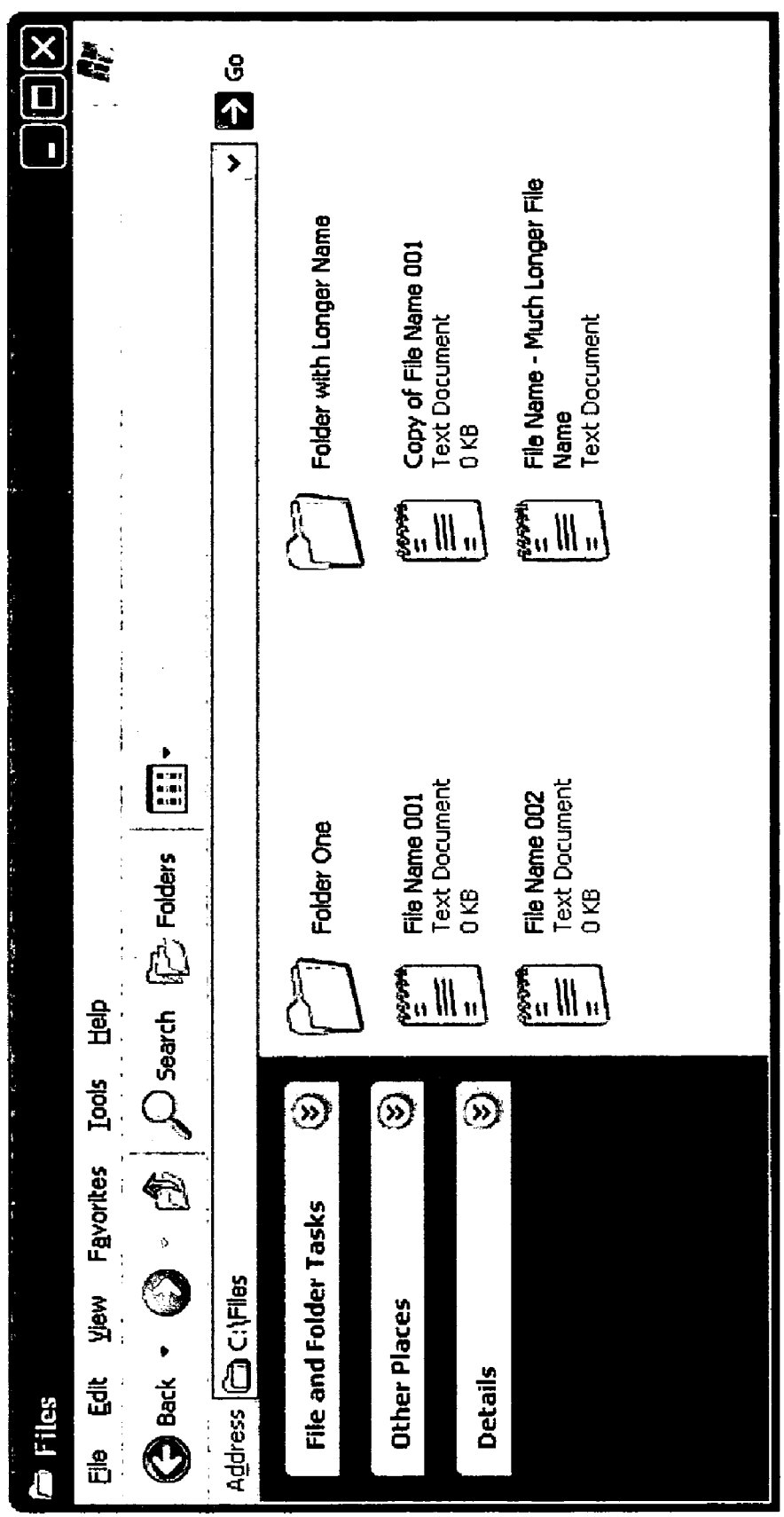

FIG. 14 represents a "ListView Tile View" which is another example of equally-sized columns. Each item comprises a grid, with definitions that are part of a group.

As described above, the size sharing may be a service set up by specifying sizing groups on the ColumnDefinitions and RowDefinitions, which may be done in many different combinations. A simple example below shows how three columns may be sized by group in a style. This may be the definition of a repeating item for databinding that keeps the columns for Groups IconSource, FileName, and FileType with equally-sized width across each repeated row, as in the following markup:

```
<!--Style for repeated item -->
<Style def:Name="*typeof( )">
    <Style.VisualTree>
        <Grid>
            <ColumnDefinition Group="IconSource"/>
            <ColumnDefinition Group="FileName"/>
            <ColumnDefinition Group="FileType"/>
            <Image Source="*Bind(Path=IconSource)"/>
            <Text Text="*Bind(Path=FileName)" Grid.Column="1"/>
            <Text Text="*Bind(Path=FileType)" Grid.Column="2"/>
        </Grid>
    </Style.VisualTree>
</Style>
<Style>
    <ItemsControl Grid.IsSharedSizeScope="true"/>
    <Style.VisualTree>
        <StackPanel ItemsControl.IsItemsHost="true"/>
    </Style.VisualTree>
</Style>
```

Figure 15:
FIG. 15 is a representation of a simplified user interface with grid rows used inside a vertically stacking container, in accordance with various aspects of the present invention.

FIG. 15 shows a representation of such a simplified, repeated user interface with grid rows used inside a vertically stacking container.

Figure 16:
FIG. 16 is a representation of simplified repeating data using a grid inside of a horizontally stacking container, in accordance with various aspects of the present invention.

Another example uses RowDefinitions of repeated items for a horizontally stacking layout, as shown in the example markup below and also represented in FIG. 16 for simplified repeating data using a grid inside of a horizontally stacking container:

```
<Grid>
    <RowDefinition Group="IconSource"/>
    <RowDefinition Group="FileName"/>
    <RowDefinition Group="FileType"/>
    <Image Source="*Bind(Path=IconSource)"/>
    <Text Text="*Bind(Path=FileName)" Background="Gray" Grid.Row="1"/>
    <Text Text="*Bind(Path=FileType)" Grid.Row="2"/>
</Grid>
```

As can be seen from the foregoing detailed description, there is described a method and mechanism that provide for shared sizing information across user interface elements. The shared sizing allows grids to maintain column and row alignment, while allowing the scope of sharing to be controlled by the user interface scene designer. The method and mechanism are flexible and straightforward for scene designers to use.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment comprising a graphical user interface, the graphical user interface comprising elements displayed according to a hierarchical arrangement of elements of the graphical user interface, a method performed by a computing system of associating related elements, the method comprising:

using a computer, creating a first definition in an element tree of a first user interface element, the first user interface element having an ancestor hierarchically above the first user interface element;

using the computer, creating a second definition in the element tree of a second user interface element, the second user interface element having the same common ancestor as the first user interface element, and wherein the same common ancestor is hierarchically above the second user interface element;

using the computer, associating the first and second definitions with a group by including a common group name in the first and second definitions;

using the computer, setting a markup, Boolean group scope value on the common ancestor;

when the markup Boolean group scope value is set and when no markup Boolean group scope values are set before the common ancestor, indicating that sharing should occur between sub-trees of the common ancestor such that the first and second definitions share information using a common information sharing object;

using the computer, associating the information sharing object with the first and second definitions, the information sharing object comprising information defining the size of the first and second user interface elements;

receiving user input, via a computer, by user interaction with a rendered representation of at least one of the first or second elements, and as a result setting a markup Boolean group scope value for at least one of the first or second definitions, but where setting a markup Boolean group scope value for at least one of the first or second definitions sets a markup Boolean group scope value before the common ancestor such that sharing does not occur before the common ancestor irrespective of the value of the group scope value of the common ancestor; and in response to setting the markup Boolean group scope value for at least one of the first or second definitions and setting a markup Boolean group scope value before the common ancestor, associating first and second distinct information sharing objects with the first and second definitions respectively, using the computer.

2. The method of claim 1 wherein associating the first and second definitions with a group comprises, attempting to register with a previously-created information sharing object, and if not previously created, creating the information sharing object.

3. The method of claim 1 wherein associating the first and second definitions with a group comprises, providing the information-sharing object with a reference to the first and second definitions, and providing the first and second definitions with a reference to the information-sharing object.

4. At least one computer-readable storage medium having computer-executable instructions, which when executed perform the method of claim 1.

5. At least one computer-readable storage medium having computer-executable instructions, which when executed perform steps, comprising:

determining a size for a first definition in a tree of user interface elements, by referencing a common information sharing object, and the tree including the first definition and a second definition, the first and second definitions sharing a common ancestor hierarchically above the first and second definitions;

changing the size of the first definition based on the determined size from the common information sharing object;

determining that the first and second definitions are associated with a common group by including a common group name in the first and second definitions;

determining that a markup Boolean group scope value on the common ancestor is set and that no markup Boolean group scope values are set before the common ancestor, the markup Boolean group scope value on the common ancestor is set and no markup Boolean group scope values are set before the common ancestor indicates that sharing should occur between sub-trees of the common ancestor, such that the first and second definitions share information and as a result the first and second definitions use the common information sharing object for size definitions; and based on determining that the first and second definitions are associated with a common group and based on determining that the markup Boolean group scope value on the common ancestor is set, and that no markup Boolean group scope values are set before the common ancestor, changing the size of a second definition that is related to the first definition based on the determined size.

6. The computer-readable storage medium of claim 5 wherein determining the size comprises evaluating a size of first content to be displayed in the first definition and a size of second content to be displayed in the second definition.

7. The computer-readable storage medium of claim 5 wherein changing the size comprises applying a programmatically-forced size.

8. The computer-readable storage medium of claim 5 wherein determining the size comprises applying a size corresponding to a master element's size.

9. The computer-readable storage medium of claim 5 having further computer-executable instructions, comprising, creating a size sharing object that relates the second definition to the first definition.

10. The computer-readable storage medium of claim 9 wherein the size sharing object relates the second definition to the first definition based on a common group property identifier associated with the first and second definition.

11. The computer-readable storage medium of claim 10 having further computer-executable instructions, comprising a third definition having an association with the common group property identifier, and further comprising, not changing the size of the second definition when changing the size of the first and second definitions based at least one scope value.

12. The computer-readable storage medium of claim 5 wherein the first and second definitions each comprise a column definition of a grid element, and wherein changing the size of the first definition and changing the size of a second definition comprise changing a column width of each column definition.

13. The computer-readable storage medium of claim 5 wherein the first and second definitions each comprise a row definition of a grid element, and wherein changing the size of the first definition and changing the size of a second definition comprise changing a row height of each row definition.

14. In a computing environment comprising a graphical user interface, the graphical user interface comprising elements displayed according to a hierarchical arrangement of elements of the graphical user interface, a method performed by a computing system of associating related elements, the method comprising:

using a computer, creating a first definition in an element tree of a first user interface element, the first user interface element having an ancestor hierarchically above the first user interface element;

using the computer, creating a second definition in the element tree of a second user interface element, the second user interface element having the same common ancestor as the first user interface element, and wherein the same common ancestor is hierarchically above the second user interface element;

using the computer, associating the first and second definitions with a group by including a common group name in the first and second definitions;

using the computer, setting a markup Boolean group scope value on the common ancestor;

when the markup Boolean group scope value is set and when no markup Boolean group scope values are set before the common ancestor, indicating that sharing should occur between sub-trees of the common ancestor; and when a markup Boolean group scope value for at least one of the first or second definitions is set indicating that sharing should not occur between sub-trees of the common ancestor, as a markup Boolean group scope value is set before the common ancestor, associating first and second distinct information sharing objects with the first and second definitions, respectively;

receiving user input, via the computer, causing a transition of the markup Boolean group scope value for at least one of the first or second definitions to not be set such that no markup Boolean group scope values are set before the common ancestor; and as a result of the transition, merging the first and second information sharing objects into a single information sharing object, using the computer, and associating the single information sharing object with the first and second definitions, using the computer, the information sharing object comprising information defining the size of the first and second user interface elements.

15. At least one computer-readable storage medium having computer-executable instructions, which when executed perform the method of claim 14.

* * * * *